March 30, 1937. G. M. FINKES 2,075,277
TOOL HANDLE
Filed April 1, 1935 2 Sheets-Sheet 1
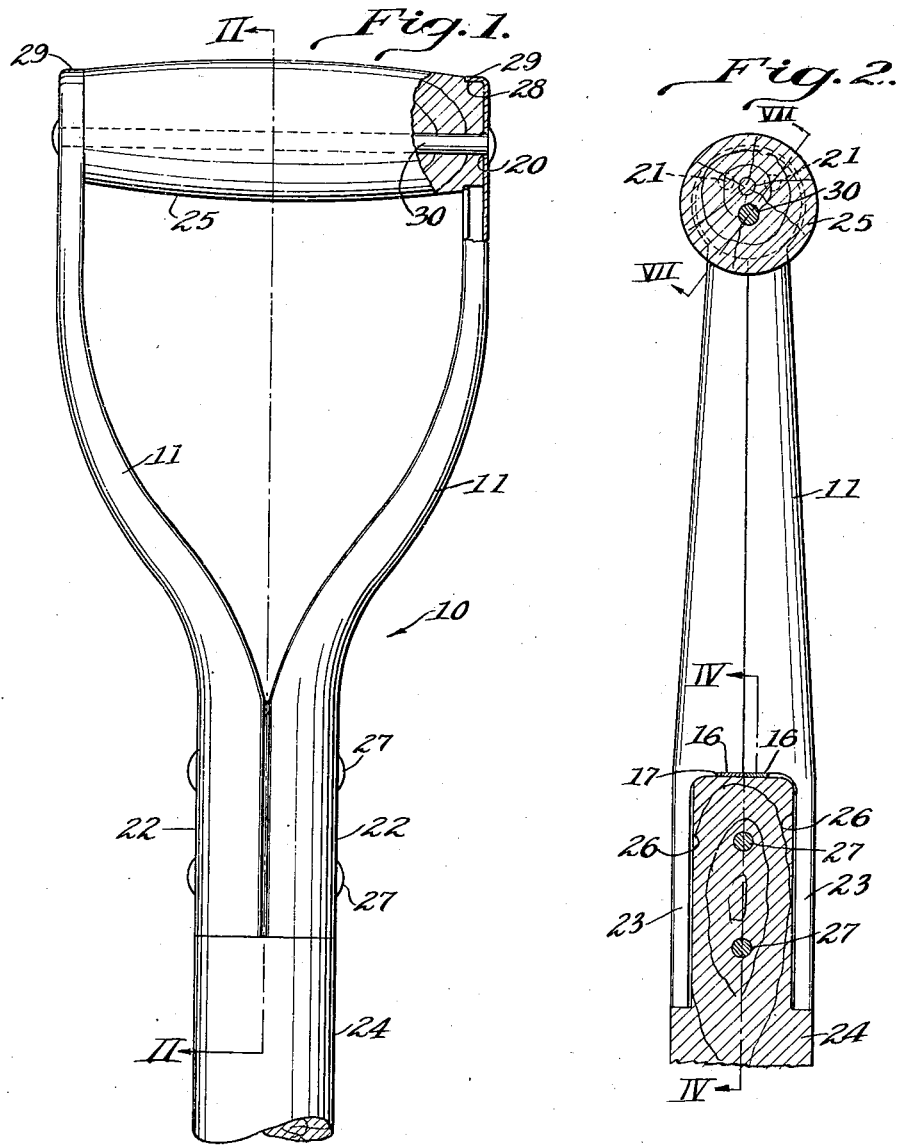
Inventor
George M. Finkes
By W. S. McDowell
Attorney March 30, 1937.  G. M. FINKES  2,075,277
TOOL HANDLE
Filed April 1, 1935  2 Sheets-Sheet 2
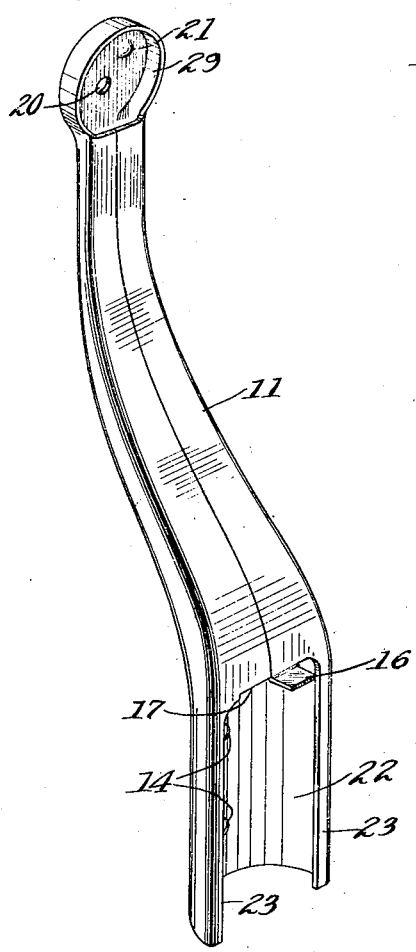
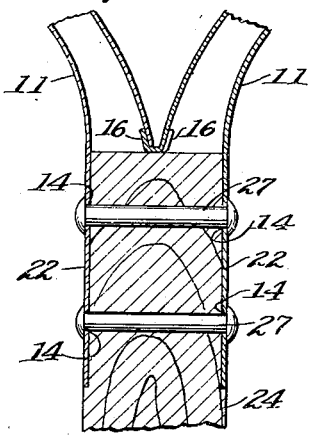
Inventor
George M. Finkes Patented Mar. 30, 1937

2,075,277

UNITED STATES PATENT OFFICE 2,075,277

TOOL HANDLE

George M. Finkes, Columbus, Ohio, assignor to The Union Fork and Hoe Company, Columbus, Ohio, a corporation of Ohio Application April 1, 1935, Serial No. 14,090

10 Claims. (Cl. 294—57)

This invention relates to an improved tool handle of the type employed in connection with shovels, spades or the like, and it is a primary object of the invention to provide a handle of the so-called Y type having a pair of tubular sheet metal arms, the said arms having their outer ends connected with a non-rotatable transverse grip and having their other or inner ends joined to form a non-welded stale receiving socket, provision being made for uniting the separable metallic arms of the handle in temporarily secured relationship prior to the application of the handle to the end of a tool stale.

It has been customary in the manufacture of tool handles of the type referred to to form the same to include sheet metal arms joined at their lower ends to provide a stale socket but in such prior art handles, it has been the practice to weld the adjoining edges of the arms together so that the arms in effect become an integral open-piece construction. This accepted practice results in the formation of stale sockets of fixed and unchangeable diameter, with the result that considerable difficulty and expense are incurred in the matter of fitting the stale ends into such sockets, particularly when there are variations in the diameter of the wooden handles or stales or in the receiving sockets therefor provided in the joined and welded sheet metal arms.

As a matter of practical manufacture, it is important that the sheet metal arms be joined and united with the transverse grip at the upper or outer ends of said arms, prior to the application of the handle as a whole to the upper end of a stale, and this has led to the practice of welding the arms along their points of juncture at the stale receiving end of the handle.

In accordance with the present invention, I provide a Y handle composed of hollow sheet metal arms which are united by mechanical fastening means and wherein the step of welding has been entirely omitted, whereby through the employment of such mechanical fasteners, I am enabled to assemble the arms and transverse grip of the handle and hold the same in such assembled relationship before the handle is secured to the end of a stale and further, I provide the stale receiving ends of the arms with registering openings for the reception of a plurality of fastening rivets which pass through said arms and through the stale insert in the socket afforded by said arms, so that the adjoining edges of the arms may remain slightly spaced to provide for variations in the diameter of the stales associated with the handle and also to overcome any looseness which may develop after some use of the tool on which the handle is provided.

Another object of the invention resides in providing the meeting edges of the tubular sheet metal handle arms at points where the stale receiving socket is produced, with inwardly directed longitudinally extending ribs or flanges, the latter being received within corresponding grooves provided in the upper ends of the tool stales, whereby when the arms are finally riveted in connection with such stales, a strong and substantial construction will be produced providing for a firm union between the handles proper and the stale as connected therewith.

For a further understanding of the invention, reference is to be had to the following description and the accompanying drawings, wherein:

Fig. 1 is a view in front elevation, and partly in vertical section of a tool handle constructed in accordance with the present invention;

Fig. 2 is a transverse sectional view taken through the handle on the plane indicated by the line II—II of Fig. 1;

Fig. 3 is a detail perspective view of one of the handle arms;

Fig. 4 is a vertical sectional view taken through the stale receiving socket of the arms on the plane indicated by the line IV—IV of Fig. 2;

Fig. 5 is a horizontal sectional view on the line V—V of Fig. 1;

Fig. 6 is a view of the blank of the sheet metal stamping from which each arm of the handle is formed;

Fig. 7 is a detail sectional view on the plane indicated by the line VII—VII of Fig. 2.

In the specific form of the invention as illustrated in the accompanying drawings, the tool handle 10 is formed to comprise a plurality of hollow, complemental, sheet metal arms 11—11. As shown in Fig. 6, each of these arms is formed from a sheet metal blank 12 and which includes a substantially rectangular lower region 13, provided with vertically spaced, centrally situated openings 14. The region 13 terminates at its upper end in a widened area 15, which is marginally shaped or stamped to provide an integral tongue 16 on one side thereof and a complemental recess 17 on its opposite side. Above the area 15, the blank is provided with upwardly converging side edges 18, which terminate in a substantially circular head portion 19, the latter being apertured as at 20 and additionally provided with horizontally spaced semi-spherical depressions 21.

Through suitable forming operations, each of these blanks is bent so that the resulting arms produced thereby, when properly mated, as shown in Fig. 1, form a handle possessing a Y-shaped configuration. In addition, each blank is bent so that the lower region 13 thereof will be provided with a substantially vertical stale-receiving socket 22 of semi-circular cross sectional form, each socket 22 terminating in vertically disposed, inwardly directed ribs or flanges 23 which mate or register with similar ribs or flanges provided on the opposite or complemental arm, the combined sockets 22 of said arms being substantially circular in form for the reception of a tool stale 24.

Before the stale 24 is inserted in the handle sockets thus provided, the arms 11 are mechanically joined without welding through the provision of the tongues 16, which are upwardly bent to interlock with the recessed portion 17 of the complemental arms, so that separation of the lower portions of said adjoining arms will be prevented. The union between said arms secured by the interlocking tongue 16 is a relatively loose one and permits of some relative movement between the adjoining lower portions of the arms 11 so that the stale receiving socket will be adapted to readily receive stale ends varying slightly in diameter. This is an important practical consideration since heretofore it has been the customary practice to unite through welding the adjoining lower portions of the metallic arm stampings, with the result that sockets of fixed diameter are produced and are incapable of responding to variations in the diameter of the interfitting stales. This often results in undesirable looseness between the handles and the stales or again in causing breakage and structural imperfections in the handle when oversized stales are forced into such sockets. Again, at the time of inserting the stales into the handle sockets, a welded socket may provide for accurate fitting, but when the wooden stales dry during storage, handling or transportation, the resulting shrinkage causes looseness.

To avoid these difficulties and manufacturing problems, I unite the handle arms through the medium of the relatively loosely engaging tongues or prongs 16 which in connection with the transverse grip 25, at the upper end of the handle, provide for a complete handle unit which may be manufactured, assembled and stored independently of the tool stales and connected with said stales to form the complete and finished tool when required, with precisely the same facility as can be obtained with the welded construction, but by avoiding the welding step and leaving the lower ends of the arms susceptible to a limited degree of relative adjustment, the handle is well adapted to receive stales produced under accepted standards of manufacture, which admit of some variation in diameter.

At the time of assembly, the stales have their upper ends grooved as at 26 for the reception of the registering ribs or flanges 23, which are received within said grooves when the stales are forced or inserted into the sockets formed for the reception thereof in the lower ends of said arms. The union is made complete and effective by the employment of transverse rivets or other equivalent fasteners 27, which pass through the spaced vertical openings 14 and also through corresponding horizontal openings provided in the upper ends of the stales. When the rivets are headed, pressure is applied to the lower ends of the arms 11, drawing the latter into firm securing engagement with the upper ends of said stales. Then, if the stales should shrink either before sale of the tools or afterwards, it is a simple matter to overcome the resulting looseness by merely again tightening the rivets or fasteners 27 to the required degree.

Above the stale receiving sockets, each of the arms 11 has imparted thereto a compound curvature and in cross section possesses an oblate hollow configuration, the meeting edges thereof being joined along the inner sides of said arms. The converging side edges 18 of the blank 12 cause the arms when finally finished to taper progressively from the lower to the upper ends thereof. In addition to this taper, each of the arms is bent to produce a compound curvature disclosed in Fig. 1 so that the joined or secured arms will possess the Y or D form well known in the art.

The transverse grip 25 is preferably of wood and has its opposite longitudinal ends reduced as at 28 and positioned within substantially circular sockets 29 formed in the head portions 19 of said arms. These elements are fastened together by a longitudinally extending rivet 30 which passes through the wooden grip 25 in offset relationship to the true axis of the grip, the ends of the rivet 30 being received within the apertures 20 of said arms. The ends of the rivet are headed, as usual, to maintain the reduced terminal portions 28 of said grip seated within the sockets 29 and in secured but non-rotatable engagement with the upper ends of the metallic handle arms. In order to positively avoid rotation of the handle grip, the semi-spherical depressions 21 of said arms are positioned within correspondingly shaped pockets 31 formed in the end surfaces of the grip 25, the depressions 21 entering the pockets 31 and are retained therein by the bolt or rivet 30 so that turning of the grip will be effectively prevented.

While I have illustrated and described one embodiment of my invention, I do not wish to be limited thereby, since the scope of the invention is best defined in the following claims.

What is claimed is:

1. A tool handle comprising a pair of complemental sheet metal members having the upper portions thereof united by a transverse grip, the lower portions of each of said members being substantially of semi-circular form and terminated in inwardly and radially directed mating ribs, said semi-circular portions providing a socket for receiving the upper end of a preformed stale, the latter having its outer walls grooved for the reception of said ribs, an integral and bendable tongue formed with each of said members contiguous to the upper end of the stale socket, said tongues being inter-engaged with the adjoining members to retain the latter in secure non-welded engagement adapted for limited relative movement, and mechanical fastening means passing transversely through the lower portions of said members and a stale position therebetween, said fastening means serving to maintain said members in secured and firm compressive engagement with the outer walls of said stale irrespective of variations in the diameter of the upper end of the stale.

2. A tool handle comprising a pair of complemental sheet metal members, said members when in assembled relationship having a Y-shaped configuration, a transverse grip having the terminal portions thereof secured to the upper ends of said members, the mating lower portions of said members being shaped to produce a stale socket, a stale having the upper end thereof positioned within said socket, interengaging means formed with said members for maintaining the lower portions of the latter in fastened relationship but permitting of limited relative movement therebetween, and additional fastening means passing transversely through the lower portions of said members and said stale for maintaining said members in compressive engagement with said stale irrespective of variations in the diameter of the stale.

3. A tool handle comprising a pair of complemental members each made as a stamping of sheet metal, each of said members comprising a curved tubular arm provided at one end with a grip socket and at the other end with a stale half-socket, the said two members being mated so that the stale half-sockets form a complete stale socket with the adjacent vertical edges of said half-sockets relatively separated, means uniting the stale receiving portions of said members in fastened relationship but providing for limited relative movement between the adjacent edges of the half-socket portions, and additional fastening means passing through said half-sockets and a stale positioned therein to unite the stale with the handle and to maintain the half-socketed portions of said members in firm compressive engagement with the outer walls of the stale irrespective of slight variations in the diameter of the stale.

4. In a tool, a D-handle therefor comprising a pair of complemental sheet metal arms, a transverse grip uniting the upper ends of said arms, the lower portions of said arms being substantially semi-circular in form, inwardly and radially disposed ribs formed with the adjacent vertical edges of the lower portions of said arms and arranged to be received in grooves provided in a stale positioned in the socket formed between the lower portions of said arms, and bendable tongues integrally formed with the lower portions of said arms and operative to retain the lower portions of the latter in assembled relationship for limited relative movement without the employment of welded unions.

5. In a D-handle construction for hand operated tools, a sheet metal casing composed of two similar members formed to embody at one end a grip socket and at the opposite end a stale socket, integral pliable tongues formed with said members for uniting the stale socket portions thereof in joined relationship but providing for limited separating movement therebetween, a transverse grip having the terminal portions thereof secured in said grip sockets, a stale positioned between the separable united ends of said members, and fastening appliances passing through said members and said stale and serving to maintain said members in secured and compressive engagement with said stale.

6. A sheet-metal D-handle head comprising two separable sections each made as a stamping of sheet metal, each of said sections comprising a curved tubular arm provided at one end with a grip socket and at the other end with a stale half-socket, said arms being of tapering cross section largest near the stale half-socket, a bendable lip integrally formed with each of said arms at the upper extremity of each of said half-sockets and arranged to engage with the upper edge of the half-socket of the other of said arms to unite said arms in assembled relationship at their stale receiving ends, integral and inwardly directed ribs projecting from the adjoining edges of said half-sockets, said ribs being receivable within grooves provided in the upper end of a stale received by said half-sockets, and transverse fastening means passing through the walls of said half-sockets and through a stale confined therebetween, said fastening means serving to unite said arms with said stale and maintain the walls of the half-sockets in compressive engagement with said stale.

7. A non-welded D-handle comprising a pair of complemental sheet metal members having the upper portions thereof united by a transverse grip, the lower portions of each of said members being substantially of semi-circular form and providing a socket for receiving the upper end of a pre-formed stale, an integral and bendable tongue formed with each of said members contiguous to the upper end of the stale socket, said tongues being interengaged with said adjoining members to retain the latter in secured non-welded engagement with each other, and fastening means passing transversely through the lower portions of said members and a stale positioned therebetween and serving independently of said tongues to secure said members to said stale.

8. A D-handle for shovels and the like comprising a pair of complemental sheet metal members having the diverging upper portions thereof united by a transverse grip, the adjoining lower portions of each of said members being substantially of semi-circular form to produce when assembled a stale-receiving socket, each of said members above said stale receiving socket being of closed hollow formation and having the extreme lower portion of the inner wall thereof provided with a bendable tongue arranged to be inter-locked with an adjoining edge portion of the opposite complemental member, whereby to retain said members independently of an associated stale in secured non-welded engagement and providing for limited relative movement therebetween.

9. A tool handle comprising a pair of complemental sheet metal members, said members when in assembled relationship possessing a Y-shaped configuration, a transverse grip extending between the upper ends of the members and having its ends positioned in sockets formed therein, the mating lower portions of said members being shaped to produce a stale socket, said lower portions being slightly spaced from one another, and an inwardly directed tongue formed on the opposing faces of the members at the upper inner end of said stale socket, the ends of said tongues being upwardly bent to lie behind the inner wall of the oppositely arranged member to limit the degree of separation of the members.

10. A tool handle comprising a pair of complemental sheet metal members, said members when in assembled relationship possessing a Y-shaped configuration, a transverse grip extending between the upper ends of the members and having its ends positioned in sockets formed therein, the mating lower portions of said members being shaped to produce a stale socket composed of spaced sections, and interengaging means formed at the inner end of said stale socket to limit separation of said stale socket forming sections.

GEORGE M. FINKES.